United States Patent [19]
Witten

[11] 3,790,873
[45] Feb. 5, 1974

[54] GATE-CATHODE POWER SUPPLY FOR A CYCLOCONVERTER NETWORK OF SILICON CONTROLLED RECTIFIERS

[75] Inventor: Arthur L. Witten, Santa Barbara, Calif.

[73] Assignee: General Motors Corporation, Detroit, Mich.

[22] Filed: May 29, 1973

[21] Appl. No.: 364,886

[52] U.S. Cl.................... 318/227, 318/231, 321/4
[51] Int. Cl. ........................................ H02p 5/40
[58] Field of Search ......... 318/227, 230, 231; 321/4

[56] References Cited
UNITED STATES PATENTS
3,702,429   11/1972   Sawyer et al. ...................... 318/227

*Primary Examiner*—Gene Z. Rubinson
*Attorney, Agent, or Firm*—Richard G. Stahr

[57] ABSTRACT

A gate-cathode power supply for the silicon controlled rectifiers of a cycloconverter network, through which the phase windings of a three-phase alternating current motor may be cyclically energized by a source of three-phase alternating current motor supply potential, of the type having three common anode and three common cathode silicon controlled rectifiers for each phase of the motor supply potential arranged in groups of three common anode silicon controlled rectifiers and groups of three common cathode silicon controlled rectifiers for each motor phase winding. The potential of each two phases of a three-phase alternating current gate-cathode power supply potential, each of the phases of which is in phase with the corresponding phase of the motor supply potential, are inverted, combined and rectified to produce three separate positive polarity direct current gate-cathode power potential pulses, each of which corresponds to the phase of the motor supply potential to which the other phase corresponds for each group of three common anode silicon controlled rectifiers and each two phases of the gate-cathode power supply potential are combined and rectified for producing three separate other positive polarity direct current gate-cathode power potential pulses, each of which corresponds to the phase of the motor supply potential to which the other phase corresponds for the three common cathode silicon controlled rectifiers for the phase of the motor supply potential to which it corresponds.

3 Claims, 3 Drawing Figures

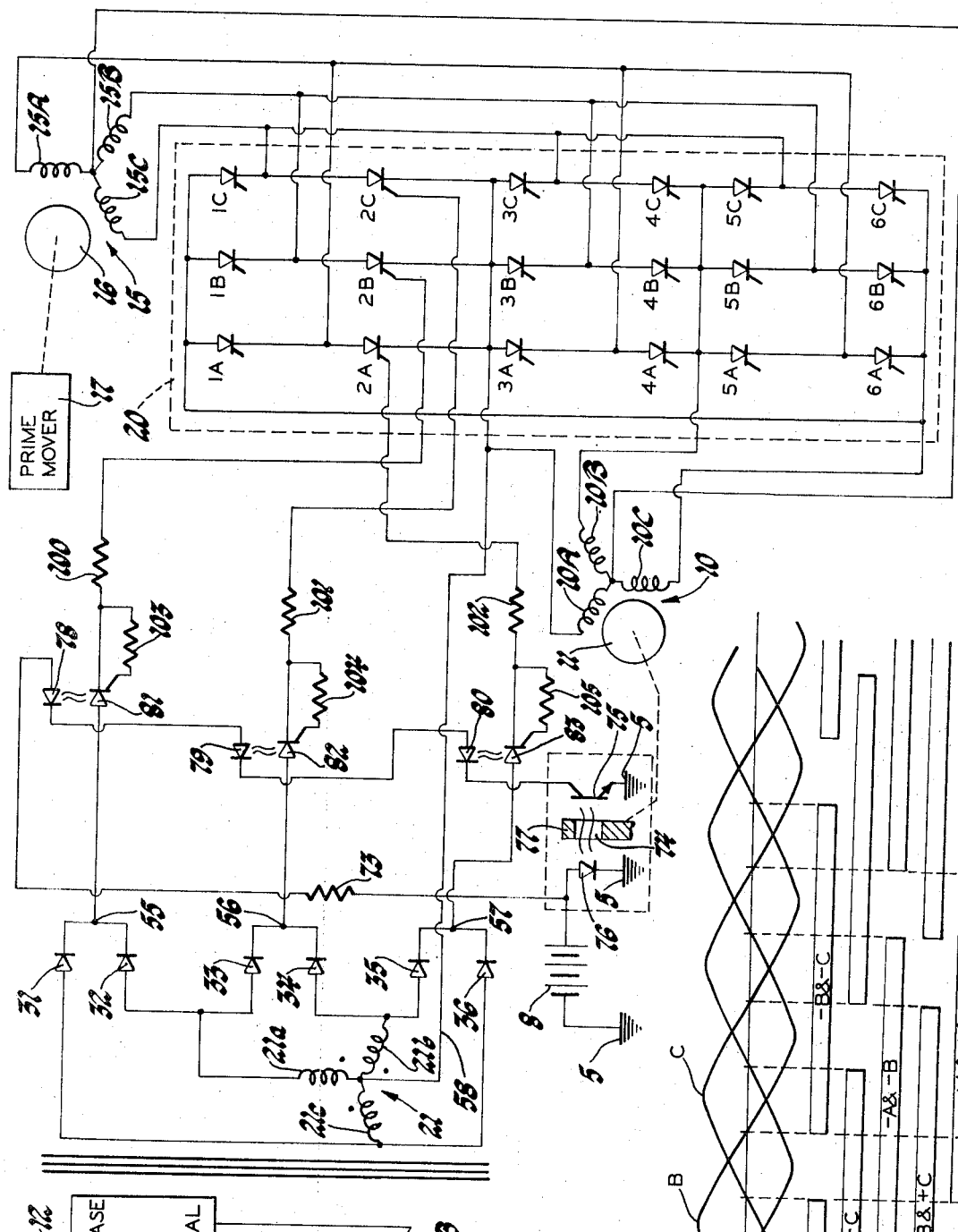

GATE-CATHODE POWER SUPPLY FOR A CYCLOCONVERTER NETWORK OF SILICON CONTROLLED RECTIFIERS

This invention is directed to a gate-cathode power supply for a cycloconverter network of silicon controlled rectifiers.

To provide for the variable speed operation of an alternating current motor without varying the frequency of the supply potential or changing the number of poles produced by the stator windings, a cycloconverter system comprised of a network of silicon controlled rectifiers which cyclically energize the phase windings of the motor at the proper time with respect to the rotor position, may be employed. The cycloconverter network of silicon controlled rectifiers is connected between the alternating current supply potential source and the motor phase windings. In cycloconverter systems for cyclically energizing the phase windings of an alternating current motor from a source of alternating current motor supply potential, each phase of the motor supply potential supplies energizing current to each phase winding of the motor in a first direction through respective positive polarity cycloconverter silicon controlled rectifiers and in a second opposite direction through other respective negative polarity cycloconverter silicon controlled rectifiers. Consequently, for each phase of the motor supply potential, there is a positive polarity common anode cycloconverter silicon controlled rectifier for each motor phase winding, having the anode electrode connected to the corresponding phase of the source of motor supply potential and the cathode electrode connected to the terminal end of the corresponding motor phase winding, through which energizing current is supplied to the motor phase winding from the source of motor supply potential, and a negative polarity common cathode cycloconverter silicon controlled rectifier for each motor phase winding, having the cathode electrode connected to the corresponding phase of the source of motor supply potential and the anode electrode connected to the terminal end of the corresponding motor phase winding, through which energizing current is returned to the source of motor supply potential. With a three-phase cycloconverter system in which a three-phase alternating current motor is supplied from a source of three-phase alternating current motor supply potential, there are three positive polarity common anode cycloconverter silicon controlled rectifiers and three negative polarity common cathode cycloconverter silicon controlled rectifiers for each phase of the motor supply potential energized in groups of three common anode silicon controlled rectifiers per group, the silicon controlled rectifiers of each of these groups supplying energizing current to the same motor phase winding from the source of motor supply potential, and in groups of three common cathode silicon controlled rectifiers per group, the silicon controlled rectifiers of each of these groups returning energizing current from the same motor phase winding to the source of motor supply potential. In operation, at least one cycloconverter silicon controlled rectifier in one group of common anode silicon controlled rectifiers and at least one cycloconverter silicon controlled rectifier of one group of common cathode silicon controlled rectifiers may be gated conductive simultaneously in a switching sequence in response to gate signals which are produced by a rotor position sensor.

It is an object of this invention to provide an improved gate-cathode power supply for a cycloconverter network of silicon controlled rectifiers.

It is an additional object of this invention to provide an improved gate-cathode power supply for a cycloconverter network of silicon controlled rectifiers which requires only a single source of three-phase alternating current gate-cathode power supply potential.

In accordance with this invention, a gate-cathode power supply for a cycloconverter network of silicon controlled rectifiers, through which the phase windings of a three-phase alternating current motor may be cyclically energized by a three-phase alternating current motor supply potential, is provided wherein each two phases of a three-phase alternating current gate-cathode power supply potential, in phase with the motor supply potential, are inverted, rectified and combined for producing separate positive polarity direct current gate-cathode power potential pulses, each of which corresponds to the phase of the supply potential to which the other phase corresponds, and each two phases of the gate-cathode power supply potential are combined and rectified for producing three separate positive polarity direct current gate-cathode power potential pulses, each of which corresponds to the phase of the supply potential to which the other phase corresponds.

For a better understanding of the present invention, together with additional objects, advantages and features thereof, reference is made to the following description and accompanying drawing in which:

FIG. 2 is a schematic diagram of a portion of the gate-cathode power supply for a cycloconverter network of silicon controlled rectifiers of this invention in combination with a cycloconverter network of silicon controlled rectifiers; and FIG. 3 is a set of curves useful in understanding the circuit of FIG. 1.

Figure 1:
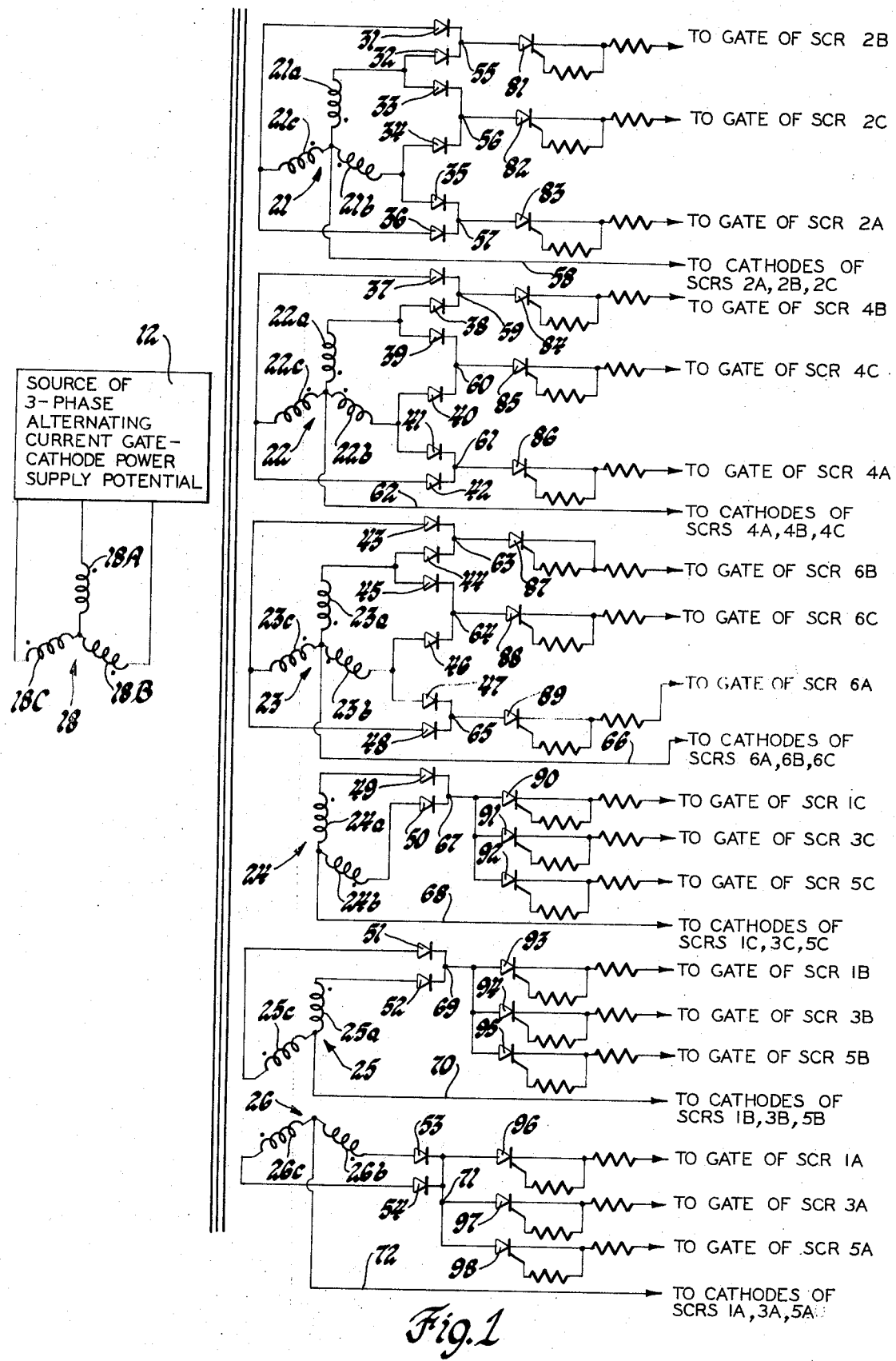
FIG. 1 is a schematic diagram of the gate-cathode power supply for a cycloconverter network of silicon controlled rectifiers of this invention.

As point of reference or ground potential is the same point electrically throughout the system, it has been illustrated in FIG. 2 by the accepted schematic symbol and referenced by the numeral 5.

In FIGS. 1 and 2, like elements have been assigned like characters of reference.

Referring to FIG. 2, the phase windings 10A, 10B and 10C of a three-phase alternating current motor 10, having a rotatable rotor member 11, may be cyclically energized by the supply potential output of a three-phase alternating current alternator 15, having output phase windings 15A, 15B and 15C, through a cycloconverter network 20 of silicon controlled rectifiers, each having anode, cathode and gate electrodes, of the type having three positive polarity common anode silicon controlled rectifiers and three negative polarity common cathode silicon controlled rectifiers for each phase of the motor supply potential arranged in groups of three common anode silicon controlled rectifiers per group, the silicon controlled rectifiers of each of these groups supplying energizing current to the same motor phase winding from the source of motor supply potential, and in groups of three common cathode silicon controlled rectifiers per group, the silicon controlled rectifiers of each of these groups returning energizing current from the same motor phase winding to the source of motor supply potential. Cycloconverter silicon controlled rectifiers 2A, 4A and 6A are the three positive polarity common anode silicon controlled rectifiers for phase A of the motor supply potential, cycloconverter silicon controlled rectifiers 2B, 4B and 6B are the three positive polarity common anode silicon controlled rectifiers for phase B of the motor supply potential, cycloconverter silicon controlled rectifiers 2C, 4C and 6C are the three positive polarity common anode silicon controlled rectifiers for phase C of the motor supply potential, cycloconverter silicon controlled rectifiers 1A, 3A and 5A are the three negative polarity common cathode silicon controlled rectifiers for phase A of the motor supply potential, cycloconverter silicon controlled rectifiers 1B, 3B and 5B are the three negative polarity common cathode silicon controlled rectifiers for phase B of the motor supply potential and cycloconverter silicon controlled rectifiers 1C, 3C and 5C are the three negative polarity common cathode silicon controlled rectifiers for phase C of the motor supply potential. Silicon controlled rectifiers 2A, 2B and 2C are the group of three common anode silicon controlled rectifiers which supply energizing current to motor phase windings 10A from the source of motor supply potential, silicon controlled rectifiers 4A, 4B and 4C are the group of three common anode silicon controlled rectifiers which supply energizing current to motor phase winding 10B from the source of motor supply potential, silicon controlled rectifiers 6A, 6B and 6C are the group of three common anode silicon controlled rectifiers which supply energizing current to motor phase winding 10C from the supply potential, silicon controlled rectifiers 1A, 1B and 1C are the group of three common cathode silicon controlled rectifiers which return energizing current from motor phase winding 10C to the source of motor supply potential, silicon controlled rectifiers 3A, 3B and 3C are the group of three common cathode silicon controlled rectifiers which return energizing current from motor phase winding 10A to the source of motor supply potential and silicon controlled rectifiers 5A, 5B and 5C are the group of three common cathode silicon controlled rectifiers which return energizing current from motor phase winding 10B to the source of motor supply potential.

As is well known in the art, when the rotor 16 of alternator 15 is rotated by a prime mover 17, a three-phase alternating current potential is induced in phase windings 15A, 15B and 15C thereof. Alternator 15 may be the alternator in the power generating plant of the local electrical utility company or it may be an on-site alternator.

To supply the gate-cathode power for the cycloconverter network 20 of silicon controlled rectifiers, a source of three-phase alternating current gate-cathode power supply potential, each of the phases of which is in phase with a corresponding phase of the motor supply potential, is provided. This source of three-phase alternating current gate-cathode power supply potential may be the supply potential output of alternator 15 or, in the case of an on-site alternator, another auxiliary alternator, having the rotor mounted upon the same shaft as rotor 16 of alternator 15 and an associated three-phase output stator winding in which a three-phase alternating current gate-catode power supply potential is generated in phase with the three-phase alternating current supply potential induced in phase windings 15A, 15B and 15C of alternator 15, may be employed. As the source of phase-three alternating current gate-cathode power supply potential may be any well known source of three-phase alternating current potential in phase with the three-phase alternating current motor supply potential, it has been illustrated in the drawing in block form and referenced by the numeral 12.

To provide direct current gate-cathode power for the silicon controlled rectifiers of cycloconverter network 20, there is provided a conventional three-phase transformer 18, FIG. 1, having three-phase primary windings 18A, 18B and 18C, across which the three-phase alternating current gate-cathode power supply potential is applied, three wye connected secondary winding groups 21, 22 and 23, each for inverting and combining the potential of each two phases of the gate-cathode power supply, and three series connected secondary winding pairs 24, 25 and 26, each for combining the potential of two different phases of the gate-cathode power supply.

Referring to FIG. 1 of the drawing, series connected secondary winding pairs 21a and 21c, 21a and 21b, and 21b and 21c of wye connected secondary winding group 21 invert, as indicated by the polarizing dots, and combine the potential of phases A and C, phases A and B and phases B and C, respectively, of the gate-cathode power supply for the group of three common anode cycloconverter silicon controlled rectifiers 2A, 2B and 2C; series connected secondary winding pairs 22a and 22c, 22a and 22b and 22b and 22c of wye connected secondary winding group 22 invert and combine the potential of phases A and C, phases A and B and phases B and C, respectively, of the gate-cathode power supply for the group of three common anode cycloconverter silicon controlled rectifiers 4A, 4B and 4C. That is, the potential of each two phases of the gate-cathode power supply is inverted and combined for each group of three common anode cycloconverter silicon controlled rectifiers. The three series connected secondary winding pairs 24a and 24b, 25a and 25c, and 26b and 26c combine the potential of phases A and B, phases A and C and phases B and C, respectively, of the gate-cathode power supply for common cathode cycloconverter silicon controlled rectifiers 1C, 3C and 5C, for common cathode cycloconverter silicon controlled rectifiers 1B, 3B, 5B and for common cathode cycloconverter silicon controlled rectifiers 1C, 3C, and 5C, respectively.

Each inverted and combined potential of each two phases of the gate-cathode power supply for each group of three common anode silicon controlled rectifiers is rectified for producing three separate respective positive polarity direct current gate-cathode power potential pulses for each group of the common anode silicon controlled rectifiers, each corresponding to the phase of the motor supply potential to which the other phase corresponds. The potential of phases A and C of the gate-cathode power supply is inverted and combined by series connected secondary winding pairs 21a and 21c, 22a and 22c, and 23a and 23c and is full-wave rectified by respective diodes 31 and 32, 37 and 38, and 43 and 44 and appears across respective junctions 55, 59 and 63 and respective leads 58, 62 and 66 as a direct current gate-cathode power potential pulse of a positive polarity upon junctions 55, 59 and 63 with respect to respective leads 58, 62 and 66 of a width equal to the combined negative half cycles of gate-cathode power supply potential phases A and C, as shown by curve C of FIG. 3, which corresponds to phase B of the motor supply potential. The potential of phases A and B of the gate-cathode power supply is inverted and combined by series connected secondary winding pairs 21a and 21b, 22a and 22b, and 23a and 23b and is full-wave rectifier by respective diodes 33 and 34, 39 and 40 and 45 and 46 and appears across respective junctions 56 and 60 and 64 and respective leads 58, 62 and 66 as a direct current gate-cathode power potential pulse of a positive polarity upon junctions 56, 60 and 64 with respect to respective leads 58, 62 and 66 and of a width equal to the combined negative half cycles of gate-cathode power supply potential phases A and B, as shown by curve D of FIG. 3, which corresponds to phase C of the motor supply potential. The potential of phases B and C of the gate-cathode power supply is inverted and combined by series connected secondary winding pairs 21b and 21c, 22b and 22c and 23b and 23c and is full-Wave rectified by respective diodes 35 and 36, 41 and 42 and 47 and 48 and appears across respective junctions 57, 71 and 65 and respective leads 58, 62 and 66 as a direct current gate-cathode power potential pulse of a positive polarity upon junctions 57, 61 and 65 with respect to respective leads 58, 62 and 66 and of a width equal to the combined negative half cycles of gate-cathode power supply potential phases B and C, as shown by curve A of FIG. 3, which corresponds to phase A of the motor supply potential.

From the description, it is apparent that wye connected secondary winding group 21 and diode pairs 31–32, 33–34, and 35–36 invert and combine the potential of each two phases of the gate-cathode power supply and produce three separate positive polarity direct current gate-cathode power potential uses, each corresponding to the phase of the motor supply potential to which the other phase corresponds, for the group of three common anode cycloconverter silicon controlled rectifiers 2A, 2B and 2C; wye connected secondary group 22 and diode pairs 37–38, 39–40, and 41–42 invert and combine the potential of each two phases of the gate-cathode power supply and produce three separate positive polarity direct current gate-cathode power potential pulses, each corresponding to the phase of the motor supply potential to which the other phase corresponds, for the group of three common anode cycloconverter silicon controlled rectifiers 4A, 4B and 4C and wye connected secondary winding group 23 and diode pairs 43–44, 45–46, and 47–48 invert and combine the potential of each two phases of the gate-cathode power supply and produce three separate positive polarity direct current gate-cathode power potential pulses, each corresponding to the phase of the motor supply potential to which the other phase corresponds, for the group of three common anode cycloconverter silicon controlled rectifiers 6A, 6B and 6C.

Each combined potential of each two phases of the gate-cathode power supply potential is rectified for producing three other separate respective first positive polarity direct current gate-cathode power potential pulses, each corresponding to the phase of the motor supply potential to which the other phase corresponds. The potential of phases A and B of the gate-cathode power supply, combined by series connected secondary winding pair 24a and 24b, is full-wave rectified by diodes 49 and 50 and appears across junction 67 and lead 68 as a direct current gate-cathode power potential pulse of a positive polarity upon junction 67 with respect to lead 68 and of a width equal to the combined positive half cycles of gate-cathode power supply potential phases A and B, as shown by curve G of FIG. 3, which corresponds to phase C of the motor supply potential; the potential of phases A and C of the gate-cathode power supply, combined by series connected secondary winding pair 25a and 25c, is full-wave rectified by diodes 51 and 52 and appears across junction 69 and lead 70 as a direct current gate-catode power potential pulse of a positive polarity upon junction 69 with respect to lead 70 and of a width equal to the combined positive half cycles of gate-cathode power supply potential phases A and C, as shown by curve F of FIG. 3, which corresponds to phase B of the motor supply potential and the potential of phases B and C of the gate-cathode power supply, combined by series connected secondary winding pair 26b and 26c, is full-wave rectified by diodes 53 and 54 and appears across junction 71 and lead 72 as a direct current gate-cathode power potential pulse of a positive polarity upon junction 71 with respect to lead 72 of a width equal to the combined positive half cycles of gate-cathode power supply potential phases B and C, as indicated by curve E of FIG. 3, which corresponds to phase A of the motor supply potential.

From this description, it is apparent that series connected secondary winding pair 24a and 24b and diode 49 and 50 combine the potential of phases A and B of the gate-cathode power supply and produce positive polarity direct current gate-cathode power potential pulses corresponding to phase C of the motor supply potential to which the other phase, phase C, corresponds; series connected secondary winding pair 25a and 25c and diodes 51 and 52 combine the potential of phase A and C of the gate-cathode power supply and produce postiive polarity direct current gate-cathode power potential pulses corresponding to phase B of the motor supply potential to which the other phase, phase B, corresponds and series connected secondary winding pair 26b and 26c and diodes 53 and 54 combine the potential of phases B and C of the gate-cathode power supply and produce positive polarity direct current gate-cathode power potential pulses corresponding to phase A of the motor supply potential to which the other phase, phase A, corresponds.

The three separate positive polarity direct current gate-cathode power potential pulses produced by wye connected secondary winding group 21 and diode piars 31–32, 33–34, and 35–36 are applied, through separate respective switching devices, across the gate-cathode electrodes of respective cycloconverter silicon controlled rectifiers 2B, 2C and 2A, FIG. 2, of silicon controlled rectifiers through which energizing current is supplied to motor phase winding 10A from the source of motor supply potential; three separate positive polarity direct current gate-cathode power potential pulses produced by wye connected secondary winding group 22 and diode pairs 37–38, 39–40, and 41–42 are applied, through separate respective switching devices, across the gate-cathode electrodes of respective cycloconverter silicon controlled rectifiers 4B, 4C and 4A of the group of three common anode silicon controlled rectifiers through which energizing current is supplied to motor phase winding 10B from the soruce of motor supply potential; three separate positive polarity direct current gate-cathode power potential pulses produced by wye connected secondary winding group 23 and diode pairs 43–44, 45–46, and 47–48 are applied, through separate respective switching devices, across the gate-cathode electrodes of respective cycloconverter silicon controlled rectifiers 6B, 6C and 6A of the group of three common anode cycloconverter silicon controlled rectifiers through which energizing current is supplied to motor phase winding 10C from the source of motor supply potential; the positive polarity direct current gate-cathode power potential pulses produced by series connected secondary winding pair 24a and 24b and diodes 49 and 50 are applied, through separate respective switching devices, across the gate-cathode electrodes of the three common cathode cycloconverter silicon controlled rectifiers 1C, 3C and 5C for the phase of the motor supply potential phase C, to which it corresponds; the postiive polarity direct current gate-cathode power potential pulses produced by series connected secondary winding pair 25a and 25c and diodes 51 and 52 are applied, through separate respective switching devices, across the gate-cathode electrodes of the three common cathode cycloconverter silicon controlled rectifiers 1B, 3B and 5B for the phase of the motor supply potential phase B, to which it corresponds; and the positive polarity direct current gate-catode power potential pulses produced by series connected secondary winding pair 26b and 26c an diodes 53 and 54 are applied, through separate respective switching devices, across the gate-cathode electrodes of the three common cathode cycloconverter silicon controlled rectifiers 1A, 3A and 5A for the phase of the motor supply potential phase A to which it corresponds.

The separate respective switching devices through which each of the positive polarity direct current gate-cathode power potential pulses is applied across the gate-cathode electrodes of the corresponding cycloconverter silicon controlled rectifier are operated to the electrical conducting condition in response to trigger signals produced by the rotor position sensor to provide for the cyclic energization of the phase windings of motor 10 from the output phase windings of alternator 15. While any satisfactory switching device may be employed for this application, the gate-cathode power supply for a cycloconverter network of silicon controlled rectifiers of this invention is particularly adapted to the use of light actuated silicon controlled rectiifers as the switching devices. These light actuated silicon controlled rectifiers are identified in FIG. 1 by reference numerals 81 through 98.

In operation and in response to each trigger signal produced by the rotor position sensor, a positive polarity direct current gate-cathode power potential pulse is applied simultaneously across the gate-cathode electrodes of each of the group of three common anode cycloconverter silicon controlled rectifiers through which energizing current is supplied to the same motor phase winding from the source of motor supply potential and across the gate-cathode electrodes of each of the group of three common cathode cycloconverter silicon controlled rectifiers through which energizing current is returned from the same motor phase winding to the source of motor supply potenial. Therefore, the cycloconverter silicon controlled rectifiers of the respective groups are selectively gated "ON" in conductive pairs to produce positive and negative motor input potential power pulses in a basic three-phase sequence.

A rotor position sensor which produces the proper trigger signals to provide for the cyclic energization of the phase windings of motor 10 in a three-phase sequence from the output phase windings of alternator 15 is disclosed and described in detail in copending United States patent application, Ser. No. 203,276, filed Nov. 30, 1971.

Briefly, the trigger signal system of the rotor position sensor includes a light emitting corresponding to each cycloconverter silicon controlled rectifier in light coupling relationship with the corresponding light actuated silicon controlled rectifier switching device of FILG. 1 and a phototransistor and a corresponding light emitting diode for each of the groups of three cycloconverter silicon controlled rectifiers. That is, a phototransistor and a corresponding light emitting diode are provided for cycloconverter silicon controlled rectifiers 2A, 2B and 2C, for cycloconverter silicon controlled rectifiers 4A, 4B and 4C, for cycloconverter silicon controlled rectifiers 6A, 6B and 6C, for cycloconverter silicon controlled rectifiers 1A, 1B and 1C, for cycloconverter silicon controlled rectifiers 3A, 3B and 3C and for cycloconverter silicon controlled rectifiers 5A, 5B and 5C. This total of six phototransistors are circumferentially arranged around the center of rotation of the armature 11 of motor 10 and axially displaced from the corresponding light emitting diodes and a shutter member having aix slots and rotated by the armature 11 of motor 10 is interposed therebetween. The six phototransistors and the axially displaced corresponding light emitting diodes are so arranged relative to the shutter slots that a phototransistor corresponding to the group of three cycloconverter silicon controlled rectifiers through which motor energizing current is supplied to the same motor phase winding from the source of motor supply potential and a phototransistor corresponding to the group of three cycloconverter silicon controlled rectifiers through which energizing current is returned from another same motor phase winding to the source of motor supply potential, are simultaneously in light coupling arrangement with the corresponding light emitting diode.

In FIG. 2, that portion of the rotor position sensor which produces trigger signals for the group of three cycloconverter silicon controlled rectifiers 2A, 2B and 2C, through which energizing current is supplied to motor phase winding 10A from alternator 15, and the circuitry through which the positive polarity direct current gate-cathode power potential pulses produced by wye connected secondary winding group 21 and diode pairs 31–32, 33–34, and 35–36 are applied across the gate-cathode electrodes of respective cycloconverter silicon controlled rectifiers 2B, 2C and 2A, is set forth in detail. The phototransistor corresponding to the group of three common anode cycloconverter silicon controlled rectifiers 2A, 2B and 2C is referenced by the numeral 75, the corresponding light emitting diode is referenced by the numeral 76, the shutter member interposed therebetween and rotated with armature 11 of motor 10 is referenced by numeral 77 and the light emitting diodes corresponding to cycloconverter silicon controlled rectifiers 2B, 2C and 2A are referenced by the numerals 78, 79 and 80 and are indicatd to be in light coupling relationship with the light actuated silicon controlled rectifiers 81, 82 and 83. Upon the illumination of phototransistor 75 by light emitting diode 76 through shutter slot 74, phototransistor 75 conducts through the collector-emitter electrodes to complete an energizing circuit for light emitting diode 78, 79 and 80 through a circuit which may be traced from the positive polarity terminal of battery 8, through current limiting resistor 73, light emitting diodes 78, 79 and 80 in series, the collector-emitter electrodes of phototransistor 75 and point of reference or ground potential 5 to the negative polarity terminal of battery 8. Upon the completion of this energizing circuit, light emitting diodes 78, 79 and 80 illuminate respective light actuated silicon controlled rectifier switching devices 81, 82 and 83. When illuminated, light actuated silicon controlled rectifier 81 conducts through the anode-cathode electrodes to apply the positive polarity direct current gate-cathode power potential pulse appearing across junction 55 and line 58 through current limiting resistor 100 across the gate-cathode electrodes of cycloconverter silicon controlled rectifier 2B, light actuated silicon controlled rectifier 82 conducts through the anode-cathode electrodes to apply the positive polarity direct current gate-cathode power potential pulse appearing across junction 56 and line 58 through current limiting resistor 101 across the gate-cathode electrodes of cycloconverter silicon controlled rectifier 2C and light actuated silicon controlled rectifiers 83 conducts through the anode-cathode electrodes to apply the positive polarity direct current gate-cathode power potential pulse appearing across junction 57 and line 58 through current limiting resistor 102 across the gate-cathode electrodes of cycloconverter silicon controlled rectifier 2A. Referring to FIG. 3, light actuated silicon controlled rectifier 81 conducts until the potential of phase A goes positive to extinguish this device, light actuated silicon controlled rectifier 82 conducts until the potential of phase B goes positive to extinguish this device and light actuated silicon controlled rectifier 83 conducts until the potential of phase C goes positive to extinguish this device. Consequently, the gate-cathode power supply for a cycloconverter network of silicon controlled rectifier of this invention self-commutates the light actuated silicon controlled rectifier switching devices. Resistors 103, 104 and 105 are bias resistors which maintain the gate electrode of each respective light actuated silicon controlled rectifier positive with respect to the cathode.

If the interest of reducing drawing complexity and confusion, only the detailed circuitry for cycloconverter silicon controlled rectifiers 2A, 2B and 2C has been illustrated in detail in FIG. 2. It is to be understood that an identical arrangement is provided for applying the positive polarity direct current gate-cathode power potential pulses appearing across junctions 59, 60 and 61 and line 62, across junctions 63, 64 and 65 and line 66 acoss junction 67 and 68, across junction 69 and line 70 and across junction 71 and line 72 across the gate-cathode electrodes of the cycloconverter silicon controlled rectifiers as labeled in FIG. 1.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A gate-cathode power supply for a cycloconverter network of silicon controlled rectifiers, through which the phase windings of a three-phase alternating current motor may be cyclically energized by a source of three-phase alternating current motor supply potential, comprising in combination with a cycloconverter network of silicon controlled rectifiers, each having anode, cathode and gate electrodes, of the type having three positive polarity common anode silicon controlled rectifiers and three negtive polarity common cathode silicon controlled rectifiers for each phase of the motor supply potential arranged in groups of three common anode silicon controlled rectifiers per group, the silicon controlled rectifiers of each of these groups supplying energizing current to the same motor phase winding from the source of motor supply potential, and in groups of three common cathode silicon controlled rectifiers per group, the silicon controlled rectifiers of each of these groups returning energizing current from the same motor phase winding to the source of motor supply potential; a source of three-phase alternating current gate-cathode power supply potential, each of the phases of which is in phase with a corresponding phase of said motor supply potential; means for inverting and combining the potential of each two phases of said gate-cathode power supply and producing three separate first positive polarity direct current gate-cathode power potential pulses, each corresponding to the phase of said motor supply potential to which the other phase corresponds, for each said group of three common anode silicon controlled rectifiers for supplying gate-cathode power or each of said group of three common anode silicon controlled rectifiers; and means for combining the potential of each two phases of said gate cathode power supply and producing three separate second positive polarity direct current gate-cathode power potential pulses, each corresponding to the phase of said motor supply potential to which the other phase corresponds, for supplying gate-cathode power for said three common cathode silicon controlled rectifiers for the phase of said motor supply potential to which it corresponds.

2. A gate-cathode power supply for a cycloconverter network of silicon controlled rectifiers, through which the phase windings of a three-phase alternating current motor may by cyclically energized by a source of three-phase alternating current motor supply potential, comprising in combination with a cycloconverter network of silicon controlled rectifiers, each having anode, cathode and gate electrodes, of the type having three positive polarity common anode silicon controlled rectifiers and three negative polarity common cathode silicon controlled rectifiers for each phase of the motor supply potential arranged in groups of three common anode silicon controlled rectifier per group, the silicon controlled rectifiers for each of these groups supplying energizing current to the same motor phase winding from the source of motor supply potential, and in groups of three common cathode silicon controlled rectifiers per group, the silicon controlled rectifiers of each of these groups returning energizing current from the same motor phase winding to the source of motor supply potential; a source of three-phase alternating current gate-cathode power supply potential, each of the phases of which is in phase with a corresponding phase of said motor supply potential; means for inverting and combining the potential of each two phases of said gate-cathode power supply and producing these separate first positive polarity direct current gate-cathode power potential pulses, each corresponding to the phase of said motor supply potential to which the other phase corresponds, for each said group of three common anode silicon controlled rectifiers, means for applying each of said first positive polarity direct current gate-cathode power potential pulses for each said group of three common anode silicon controlled rectifiers across said gate-cathode electrodes of the said common anode silicon controlled rectifier for the phase of said motor supply potential to which it corresponds; means for combining the potential of each two phases of said gate cathode power supply and producing three separate second positive polarity direct current gate-catode power potential pulses, each corresponding to the phase of said motor supply potential to which the other phase corresponds; and means for applying each of said second positive polarity direct current gate-cathode power potential pulses across said gate-cathode electrodes of the said three common cathode silicon controlled rectifiers for the phase of said motor supply potential to which it corresponds.

3. A gate-cathode power supply for a cycloconverter network of silicon controlled rectifiers, through which the phase windings of a three-phase alternating current motor may be cyclically energized by a source of three phase alternating current motor supply potential, comprising in combination with a cycloconverter network of silicon controlled rectifiers, each having anode, cathode and gate electrodes, of the type having three positive polarity common anode silicon controlled rectifiers and three negative polarity common cathode silicon controlled rectifiers for each phase of the motor supply potential arranged in groups of three common anode silicon controlled rectifiers per group, the silicon controlled rectifiers of each of these groups supplying energizing current to the same motor phase winding from the source of motor supply potential, and in groups of three common cathode silicon controlled rectifiers per group, the silicon controlled rectifiers fo each of these groups returning energizing current from the same motor phase winding to the source of motor supply potential; a source of three-phase alternating current gate-cathode power supply potential, each of the phases of which is in phase with a corresponding phase of said motor supply potential; a three-phase transformer having a three-phase primary winding, across which said three-phase alternating current gate-cathode power supply potential is applied, three wye connected secondary winding groups, each for inventing and combining the potential of each two phases of said gate-cathode power supply, and three series connected secondary winding pairs, each for combining the potential of two different phases of said gate-cathode power supply potential, means for rectifying each said inverted and combined potential of each two phases of said gate-cathode power supply potential of each said wye connected secondary winding group for producing three separate first positive polarity direct current gate-cathode power potential pulses, each corresponding to the phase of said motor supply potential to which the other phase corresponds; means for rectifying each said combined potential on each two phases of said gate-cathode power supply for producing three separate second positive polarity direct current gate-cathode power potential pulses, each corresponding to the phase of said motor supply potential to which the other phase corresponds; means for applying each of sad first positive polarity direct current gate-cathode power potential pulses for each said group of three common anode silicon controlled rectifiers across said gate-cathode electrodes of the said common anode silicon controlled rectifier for the phase of said motor supply potential to which it corresponds; and means for applying each of said second positive polarity direct current gate-cathode power potential pulses across said gate-cathode electrodes of the said three common cathode silicon controlled rectifiers for the phase of said motor supply potential to which it corresponds.

* * * * *

PO-1050
(5/69)

UNITED STATES PATENT OFFICE
CERTIFICATE OF CORRECTION

Patent No. 3,790,873      Dated February 5, 1974

Inventor(s) Arthur L. Witten

It is certified that error appears in the above-identified patent and that said Letters Patent are hereby corrected as shown below:

Col. 5, line 8, "rectifier" should read -- rectified --; line 23, "71" should read -- 61 --; line 36, "uses" should read -- pulses --. Col. 6, line 11, "gate-catode" should read -- gate-cathode --; line 38, "postiive" should read -- positive --; line 50, "piars" should read -- pairs --. Col. 7, line 30, "an" should read -- and --. Col. 8, line 11, after "emitting" insert -- diode --; line 14, "FILG" should read -- FIG.--; line 30, "aix" should read -- six --. Col. 9, line 49, "If" should read -- In --. Col. 11, line 1, "these" should read -- three --; line 41, "fo" should read -- of --. Col. 12, line 10, "invent-" should read -- invert- --; line 23, "on" should read -- of --; line 30, "sad" should read -- said --.

Signed and sealed this 9th day of July 1974.

(SEAL)
Attest:

McCOY M. GIBSON, JR.
Attesting Officer

C. MARSHALL DANN
Commissioner of Patents